(12) United States Patent
Meridian (10) Patent No.: US 7,986,331 B1
(45) Date of Patent: Jul. 26, 2011

(54) SOURCE LENS FOR VIEWING AND EDITING ARTWORK

(75) Inventor: Julie Meridian, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 998 days.

(21) Appl. No.: 11/897,829

(22) Filed: Aug. 31, 2007

(51) Int. Cl.
*G09G 5/00* (2006.01)
(52) U.S. Cl. .......................................................... 345/619
(58) Field of Classification Search .................. 345/619, 345/650–654, 661–665, 676–680
See application file for complete search history.

(56) References Cited

U.S. PATENT DOCUMENTS 6,462,750 B1 * 10/2002 Plow et al. .................... 345/619
7,269,794 B2 * 9/2007 Martinez et al. .............. 715/758

OTHER PUBLICATIONS

Adobe Photoshop Lightroom. "Zoom An Image." [Online]. Oct. 3, 2007. <http://livedocs.adobe.com/en_US/Lightroom/1.0/WSE6BCD704-F201-4e67-B295-99C46203DF7E.html>.
Adobe Bridge. "Preview and Compare Images." [Online]. Oct. 3, 2007. <http://livedocs.adobe.com/en_US/Bridge/2.0/WS7049512F-0Ed0-4f33-B6D9-D7B89F8F0909.html>.

* cited by examiner

*Primary Examiner* — Jeffery A Brier
(74) *Attorney, Agent, or Firm* — Robert C. Kowert; Meyertons, Hood, Kivlin, Kowert & Goetzel, P.C.

(57) ABSTRACT

Techniques for implementing a source lens for viewing and editing artwork are described, including receiving input indicating selection of an object, receiving another input indicating positioning a source lens over a portion of the object, the source lens being configured to reveal at least one underlying source of the portion, and revealing at least one underlying source of the portion.

18 Claims, 7 Drawing Sheets

SOURCE LENS FOR VIEWING AND EDITING ARTWORK

FIELD OF THE INVENTION

Embodiments relate generally to software and user interfaces. More specifically, source lens for viewing and editing artwork is described.

BACKGROUND OF THE INVENTION

There are various conventional software applications for creating artwork. Some artwork appears two dimensional ("2D"), and some artwork appears three dimensional ("3D"). Artwork may be still (i.e., motionless) or may give an appearance of motion (e.g., a movie or an animation). Artwork includes vector graphical elements, raster graphical elements, text elements, other elements, or a combination of different types of elements.

Artwork typically includes one or more objects. Each object typically comprises graphical and/or non-graphical elements. For example, an image of a teapot can include a structural element (e.g., a wireframe that provides the shape of a teapot), a textural element (i.e., the surface of the teapot), a lighting element, a shadow element, and a reflection element. There are usually other elements and objects that give a realistic appearance to the teapot, such as one or more teacups, saucers, and spoons.

However, conventional techniques used to manipulate objects and elements within artwork can be frustrating and time consuming. In some conventional examples, a user often needs to edit the wireframe of an object in order to change its shape. To change or edit an object or element (e.g., the wireframe), users are typically limited to using problematic conventional techniques and computer software, programs, or applications ("applications"). Conventional applications and workflow processes are onerous and difficult to perform easily. For example, users are often required to (1) deactivate or hide other elements (e.g., surface texture, lighting, shadow, and reflection) to reveal a wireframe, edit the wireframe, then reactivate or "unhide" (i.e., reveal) other elements to view the edited results; (2) if other elements can be moved, move one or more of the other elements away from the object to expose the wireframe, edit the wireframe, then move the other elements back to view the edited results; and (3) if an application includes different modes (e.g., edit mode, outline mode, and preview mode), activate a mode that allows editing the wireframe, edit the wireframe, then activate another mode (e.g., preview mode) to view the edited results.

Further, an element or object can be accidentally deactivated, selected, or moved, especially in artwork that includes multiple objects or elements. To prevent undesired consequences from accidental actions, a user typically takes additional steps, such as locking one or more elements or objects to prevent accidental deactivation, selection, and movement. Further, hiding elements, moving elements, or activating a different mode inadvertently changes the artwork.

Thus, a solution for viewing and editing artwork without the limitations of conventional techniques is needed.

BRIEF DESCRIPTION OF THE FIGURES

Various examples are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the examples has not been described in detail to avoid unnecessarily obscuring the description.

In some examples, the described techniques may be implemented as a computer program or application ("application") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including C, Objective C, C++, C#, ActionScript™, Flex™, Lingo™, Java™, Javascript™, Ajax, COBOL, Fortran, ADA, XML, MXML, HTML, DHTML, XHTML, HTTP, XMPP, and others. Design, publishing, and other types of applications such as Dreamweaver®, Shockwave®, Flash®, and Fireworks® may also be used to implement the described techniques. The described techniques may be varied and are not limited to the examples or descriptions provided.

Various examples of source lenses and their operations are described, including viewing and editing underlying data or sources of one or more objects or elements. Devices, computing systems, graphical user interfaces, and programming instructions that implement various source lenses are also described. Any objects or any elements of an object that can be created can be viewed or edited using a source lens, according to various examples. For example, a source lens may be a tool or widget deployed to view and/or edit one or more vector-based objects, raster-based objects, or objects composed with other data or sources, such as audio data. Objects in artwork may audio or visual, such as two dimensional ("2D") or three dimensional ("3D") objects.

Figure 1:
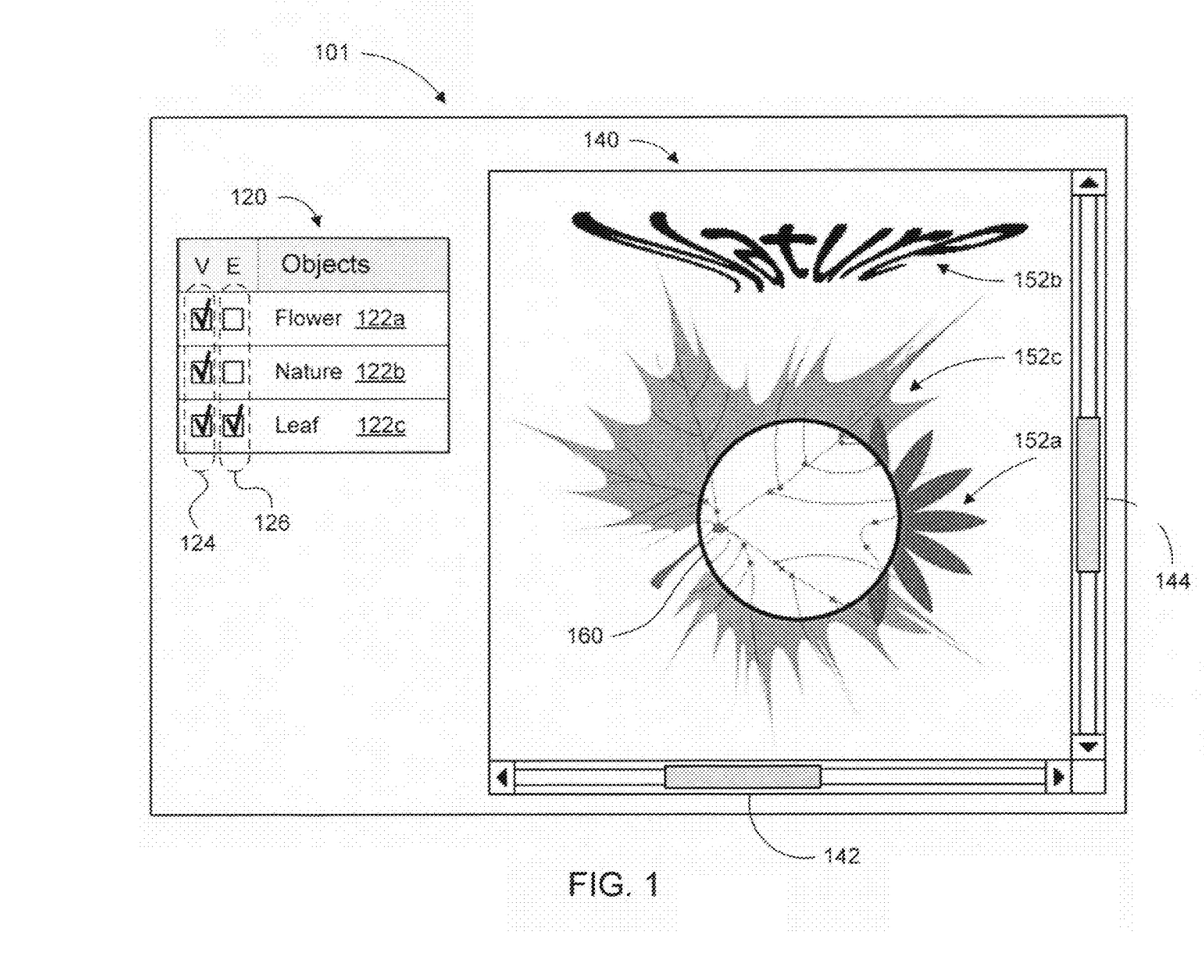
FIG. 1 illustrates an exemplary source lens.

FIG. 1 illustrates an exemplary source lens. One or more examples describe various techniques, procedures, processes, user interfaces, or methods for implementing a source lens. In other examples, source lenses may be implemented differently and are not limited to the examples provided and described. Here, display 101 includes an object organization panel 120 and work window 140. In some examples, there may be no object organization panel, or display 101 may include additional panels, widgets, controls, or elements. Here, three objects 152a-c are shown in work window 140 and their corresponding object titles 122a-c are shown in object organization panel 120.

As used herein, in some examples, the term "object" in the context of a source lens refers generally to any conceptual element or entity that can be selected and manipulated (e.g., moved or edit). In some examples, an object may be an audio object (e.g., a sound clip). In other examples, an object may be a visual object that may appear to be 2D or 3D. An object may be still (motionless) or give an appearance of motion (e.g., video, movie, or animation). Objects include assets (e.g., graphics and logos), vector graphics, raster graphics, images, drawings, photographs, maps, and documents, texts, styles (e.g., fonts and formats), effects (e.g., animation, rotation, movement, and scaling), filters (e.g., masks, colors, and grayscale), blend options, and the like. An object in an environment or context may be composed of multiple objects in another environment or context. For example, leaf object 152c may be an object in an environment and multiple objects in another environment. In some applications, two or more objects may be merged or grouped together to form an object that may be selected and manipulated as a whole. Artwork may include objects of different types (e.g., audio objects and visual objects).

An object or an element of an object may be composed of any data or any sources. For example, an object or an element of an object may be composed of audio data, vector-based data, raster-based data, characters or text-based data, or other types of data or sources. As used herein, in some examples, the terms "source," "underlying source," and "source data" in the context of a source lens refer generally to any data, mathematics, text, instructions, or combination thereof that can be visually represented or used to determine an object or element. For example, an object or element of an object may be defined by audio data (e.g., mp3, wave, Windows Media Audio, raw (i.e., uncompressed, unformatted) audio data, or others), raster data (e.g., pixel or bitmap data), vector data (e.g., vector paths, vector mathematics, bezier curves, b-spline curves, wireframe definitions, or polygon definitions), text (e.g., text-based "Nature" object 152b), instructions (i.e., for creating animation, rotation, movement, scaling, or morphing), or the like. In some examples, an object may be composed of more than one underlying source. For example, when two or more objects are merged or grouped together to form an object, the newly-formed object is composed of the underlying sources of the pre-merged objects. For example, if a tree branch object is created by merging a twig object with three leaf objects, the underlying sources of the tree branch object includes the underlying sources of the twig object and the three leaf objects. After merging the twig and leaf objects, these objects may become elements of the tree branch object.

In some examples, object organization panel ("OOP") 120 shows that objects may be organized in an arbitrary order. In other examples, such as that described in FIG. 2A below, objects may be organized differently. Referring to FIG. 1, OOP 120 is used to manage three objects with object titles: "Flower" 122a, "Nature" 122b, and "Leaf" 122c. Object titles may be arranged and shown in any order. For examples, object title "Leaf" 122c may be moved above object title "Nature" 122b or above object title "Flower" 122a. In some examples, OOP 120 may include one or more audio objects (not shown). In other examples, the order of the object titles in OOP 120 indicates the display order of the objects (e.g., 152a-152c) in work window 140.

In some examples, one or more objects may be activated or selected for viewing, editing, or other purpose. OOP 120 shows, for example, that each object can be selected for viewing using view check boxes 124. Further, an object may be selected for editing using edit check boxes 126. Some examples may include no check boxes or one set of check boxes that combine selection with viewing and editing of objects. In other examples, there may be additional sets of check boxes (not shown) for selecting and activating other properties, such as printing and locking of objects. Objects may be identified or selected differently in other examples. The above-described object identification or selection techniques may be varied in design, implementation, or other aspects, and are not limited to the examples shown and described.

Work window 140 is configured, in some examples, to show artwork having one or more objects. Work window 140 can display any number of objects. Here, three objects are shown: flower object 152a, text object "Nature" 152b, and leaf object 152c. In some examples, there may be fewer than three objects. In other examples, there may be more than three objects, such as five, eight, 11, 19, 32, 47, 120, 500, 1000, or as many objects as required to create an artwork.

In some examples, work window 140 may include navigation controls 142 and 144 for positioning or navigating an artwork. Here, navigation controls 142 and 144 are shown as scrollbars. In other examples, there may be other types of navigation controls, such as buttons, icons, keys, widgets, and the like. Further, more, fewer, or different navigation controls apart from those shown may be used.

Leaf object 152c is shown in the environment or context of a single object. Leaf object 152c can be created, for example, by laying out veins or vein skeleton that determines the structure of a leaf. The vein skeleton is the underlying data or source of leaf object 152c. The other elements of leaf object 152c (e.g., the leafs texture, lighting, shadow, and colors) can be generated, for example, by activating one or more attributes, variables, properties, effects, options, filters, or the like.

A source lens, according to various examples, is designed with the capability to show the underlying sources or information about the underlying sources of one or more objects. In some examples, a source lens may be a tool for use in a graphical user interface, which when positioned over a portion of one or more selected objects, the underlying sources of the portion are revealed. Here, source lens 160, shown inside work window 140, reveals at least one underlying source of, for example, leaf object 152c. Source lens 160 may be configured or implemented to show underlying sources with any background (e.g., white, gray, tan, beige, black, blue, green, other color, checkered pattern, grid pattern, or other pattern). In some examples, source lens 160 can be implemented to allow editing, accessing, or interacting with the underlying sources of objects. The capability to interact with the sources of an object may allow other manipulations of the object.

In other examples, objects selected or activated for printing or viewing, for example, may be shown and edited through source lens 160. In one or more examples, objects may be selected or activated specifically for source lens operations before being able to view or edit through source lens 160. Here, for illustration purposes, objects selected for editing (e.g., by selecting one or more edit check boxes 126) may be shown and edited through source lens 160.

Source lens 160 may be activated and deactivated at any time. Source lens 160 may be activated and deactivated using various techniques, such as selecting an item from a menu or sub-menu; selecting a control, widget, or icon; or pressing a key or a combination of keys on a keyboard. When activated, source lens 160 may appear anywhere in display 101, such as in the middle of work window 140, on top of a selected object, or in substantially the same position from which source lens 160, for example, was previously deactivated. When deactivated, source lens 160 may disappear from display 101.

Here, source lens 160 has been activated and is shown in the shape of a circle. In some examples, source lens 160 may be in any shape (e.g., oval, rectangle, square, triangle, star, trapezoid, polygon, an irregularly-shaped enclosed area, or others.) In other examples, source lens 160 may be a floating widget or tool capable of being positioned or repositioned anywhere in display 101. For example, source lens 160 may be floated over any part of work window 140 (i.e., over any part of the artwork shown in work window 140). In still other examples, source lens 160 may be resized to any size, including the size of work window 140 or the size of display 101. In some examples, one or more objects shown though source lens 160 may be viewed using a "zoom in" or "zoom out" feature, which may be further configured using the techniques described herein to reveal different detail levels. The zoom feature is further described below and shown in connection FIGS. 2A and 2B.

Referring back to FIG. 1, a selection or check mark (e.g., caused by clicking a pointer in a selection box) in edit check box 126 next to object title "Leaf" 122c shows that leaf object 152c has been selected for editing. When source lens 160 is positioned over any portion of leaf object 152c, one or more underlying sources of the portion is revealed through source lens 160, as shown. In some examples, flower object 152a may be positioned above and partially occupy the same overlapping space with leaf object 152c. When source lens 160 is positioned over a portion of flower object 152a and flower object 152a is not selected for editing (i.e., edit check box 126 next to object title "Flower" 122a is not checked), no source of flower object 152a is showing through source lens 160. Likewise, automatically-generated styles, effects, or filters of leaf object 152c (e.g., the leaf's texture, lighting, shadow, and colors) are applied to leaf object 152c in work window 140, but are not applied to leaf object 152c in source lens 160. With overlap between flower object 152a and generated styles, effects, and/or filters not shown in source lens 160, the underlying sources of leaf object 152c can be revealed, accessed, and edited through source lens 160 without removing styles or effects or changing view or mode.

The underlying sources of an object can be edited using any technique, tool, or application. For example, an underlying source of leaf object 152c may be vector-based data. In some examples, the structure or veins of leaf object 152c may be composed of one or more vector paths. Vector paths may be selected and edited (e.g., moved or shaped) directly. In other examples, a vector path may be accompanied by one or more points and handles (not shown). In still other examples, one or more paths may be edited by selecting, moving, or otherwise manipulating the points and handles to shape the vector paths. Points and handles may also be added or removed to form the desired vector paths, thus, the desired structure of leaf object 152c.

In some examples, leaf object 152c may be implemented in environments where the leaf is composed of multiple objects (not shown). For example, the leaf structure (e.g., the vein skeleton) may be an object. Other elements (e.g., surface texture, shade, reflection, colors, and the like) may be separately-created objects. As an example, the structure or veins of leaf object 152c may be viewed through source lens 160 by selecting the leaf structure object and ensuring the other objects (e.g., surface texture, shade, reflection, and colors) are not selected. Likewise, the structure or veins of leaf object 152c may be edited using source lens 160. Unselected objects may be selected, viewed, and edited with the leaf structure object.

In some examples, one or more objects may be audio objects or visual objects that represent data or other sources (not shown). For example, a visual object (e.g., a pie chart, graph, or other visual data representations) may be any visual form representing the underlying source data (e.g., numerical data). As another example, an audio object (e.g., an audio clip) may be visually represented by a waveform or spectrogram. In other examples, an audio object may be represented by a symbol of a waveform and not the actual waveform associated with the audio content. In still other examples, one or more effects may be applied on top of a waveform that may affect the appearance of the waveform. Source lens 160 may be positioned over one or more objects (e.g., audio objects) to reveal, for example, the actual data or waves of the objects. In some examples, the underlying sources (e.g., sound waves and numerical data) of one or more objects can be edited using any techniques, tools, or applications.

When finished viewing or editing the underlying sources of one or more objects through source lens 160, objects may be deselected, other objects may be selected, or source lens 160 may be deactivated. Deselecting an object (e.g., removing a check mark in the edit check box 124 associated with the object's title) ceases showing the object through source lens 160; thus, disabling viewing or editing the underlying sources of the object through source lens 160. An object appears (i.e., is revealed) in source lens 160 when the object is selected (e.g., adding a check mark in the edit check box 124 associated with the object's title), which enables underlying sources of the object to be viewed or edited using source lens 160. For example, in FIG. 2A, leaf object 152c has been deselected for editing (i.e., the edit check box 226a next to object title "Leaf" 122c is not checked) and flower object 152a has been selected for editing (i.e., the edit check box 226a next to object title "Flower" 122a is checked). Having been selected for editing, source lens 260a reveals the underlying sources of flower object 152a, and the sources may be edited.

Figure 2A:
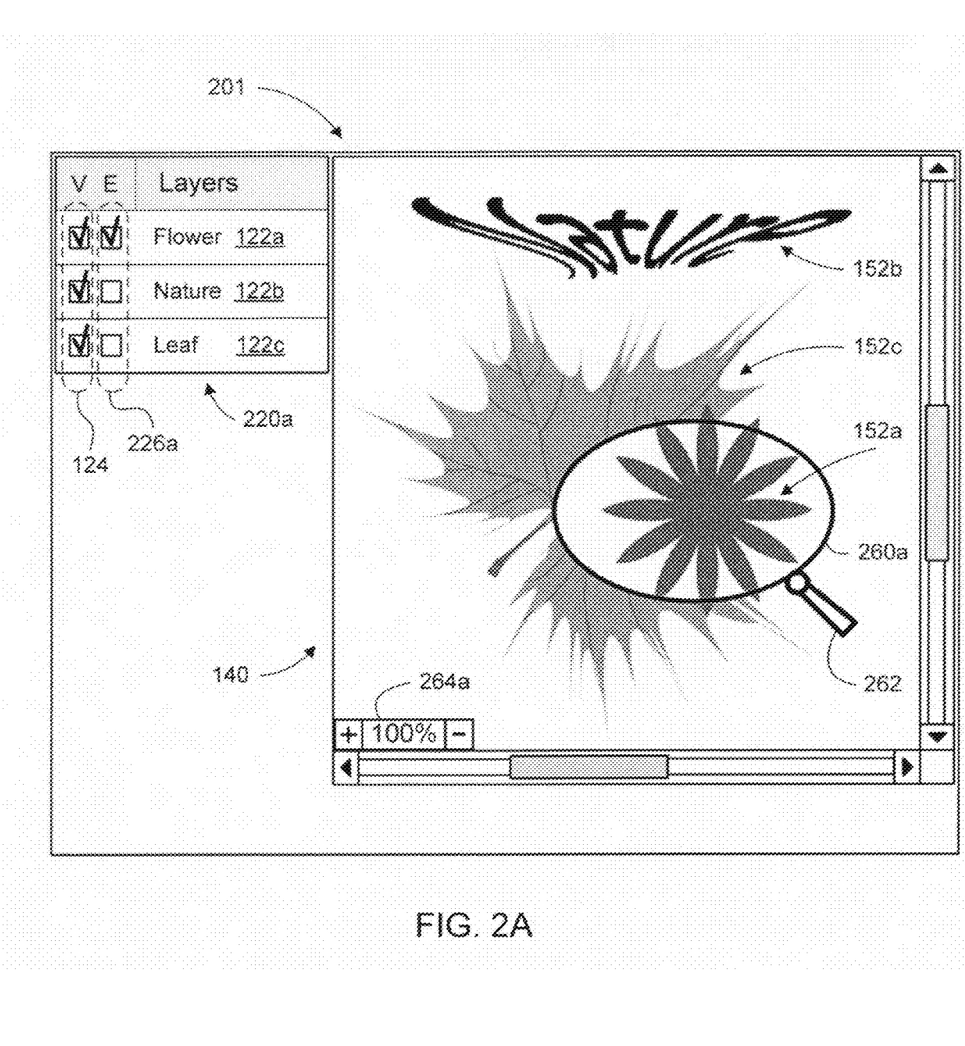
FIGS. 2A and 2B illustrate alternative exemplary source lenses.
Figure 2B:
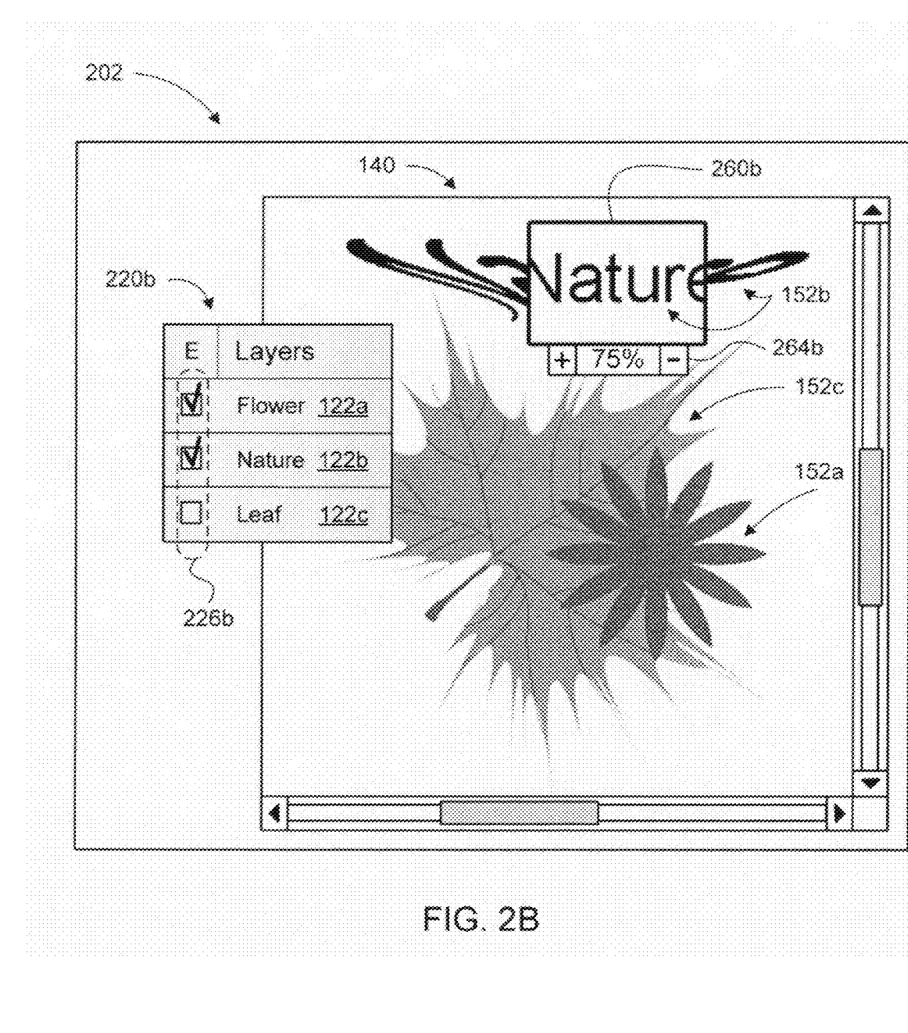

FIGS. 2A and 2B illustrate alternative exemplary source lenses. FIG. 2A shows that OOP 220a and work window 140 may be docked (i.e., fixed to a location) near a side or a corner of display 201. Here, OOP 220a is docked to the upper-left corner and work window 140 is docked to the upper-right corner of display 201.

In some examples, OOP 220a shows that objects may be organized in layers. A layer may include one or more objects or elements. For illustration purposes, in OOP 220a, each object may be placed in a separate layer (i.e., each layer includes one object). Here, selecting an object (e.g., flower object 152a) comprises selecting the layer (e.g., "Flower" 122a) that includes the object. In some examples, OOP 220a may include other layer properties, such as the ability to: (1) apply a visual effect to the objects and elements in a layer; (2) assign display precedent, such as displaying an object in a higher layer on top of another object in a lower layer if both objects occupy overlapping space; and (3) lock contents and composition of the layer to prevent, for example, selecting, viewing, editing, or printing. Although not shown, one or more layers may be organized in a folder or other organization structures. A folder may be expanded to reveal the set of objects or layers included within; closed to hide the object or layer set; moved; or applied to other operations.

In FIG. 2A, source lens 260a is illustrated in an oval shape. In some examples, source lens 260a further includes a handle 262. In other examples, handle 262 may be turned on (i.e., shown) or turned off (i.e., not shown), for example, by selecting an item from a menu or sub-menu; selecting a control, widget, or icon; or pressing a key or a combination of keys on a keyboard. Here, handle 262 may be configured to facilitate positioning, moving, relocating, or repositioning source lens 260a. In other words, when a user interacts with handle 262 using, for example, an input/output device such as a keyboard, mouse, or others, source lens 260a may be moved to different locations within display 201. For example, source lens 260a may be repositioned using a control pointer to drag handle 262 and source lens 260a to a desired location or position in display 201. In some examples, source lens 260a may be positioned by a key knob, joystick, or pressing one or more keys on a keyboard (e.g., one or more directional or arrow keys).

In some examples, source lens 260a may be resized to any size, including a size sufficient to reveal or show one or more objects, the size of work window 140, or the size of display 201. Source lens 260a may be resized to any size, shape, or dimension using various controls. Here, source lens 260a may be resized by moving a control pointer over any part of the edge of source lens 260a (i.e., any part of the oval rim), clicking on the edge, and dragging source lens 260a outward to enlarge and inward to reduce the size of source lens 260a. In some examples, one or more keys may be used to resize source lens 260a, such as pressing a plus ("+") key, a minus ("−") key, or a number key at the same time with the "Control" or "Ctrl" key. In other examples, source lens 260a may be automatically resized in certain situations. In still other examples, source lens 260a may be resized manually. For example, when editing an object through source lens 260a, source lens 260a may automatically resize or enlarge to reveal the entire object that is being edited (i.e., revealing the underlying sources of the entire object).

In some implementations, source lens 260a may include zoom control 264a. Zoom control 264a may be placed anywhere in display 201, including near a side or corner of work window 140 (as shown) or in close proximity to a source lens (260b, FIG. 2B). Zoom control 264a may include a control for zooming in (e.g., a "+" control) and a control for zooming out (e.g., a "−" control). In one or more implementations, zoom control 264a may include a zoom level indicator (e.g., an information box showing the detail level is at, for example, 100%). One or more objects shown though source lens 260a may be zoomed in or zoomed out to reveal different detail levels. The type, quantity, and resolution of details may be different for various levels of zoom. For example, details may be provided based on any level indicated by, for example, a percentage number. In some examples, one or more preset levels may be provided, such as 25%, 50%, 75%, 100%, 120%, 140%, 175%, 200%, 300%, 400%, 600%, and 800%. In other examples, one or more preset levels may be relative to artwork. For example, there may be a preset level labeled "Object" that, when selected, automatically zooms to a detail level to show a selected object through source lens 260a.

Here, flower object 152a is shown at a 100% detail level. For description purposes, flower object 152a is a raster-based object (e.g., comprises of bitmap or pixel data). The underlying sources of a raster object may be edited with any raster-based technique, tool, or application. Here, pixels or bitmaps may be added, changed, or deleted to modify flower object 152a. A color of flower object 152a may be changed, for example, from pink to violet by changing the color composition of the pixels of the flower. Color composition or color model may be implemented, for example, in red-green-blue composition, hue-saturation-brightness composition, cyan-yellow-magenta-black composition, luminance-A-B composition, grayscale, back and white, or other model.

In some examples, flower object 152a may be implemented in environments where the flower is composed of multiple objects (not shown). For example, a base flower object, a color gradient object, a lighting object, and surface pattern object may form a bright, textured object such as rainbow flower object 152a. In these environments, viewing or editing the base flower object through source lens 260a may be done by selecting the base flower object. Editing the base flower object can be done in context (i.e., seeing the other objects in work window 140), without changing the current positions, mode, view, or visibility of the other objects. In some examples, multiple objects may be edited using various, techniques, tools, or applications. For example, to change the shape of flower object 152a, two or more objects (i.e., base flower, color gradient, lighting, and surface pattern) may be selected and their pixels may be deleted or cropped simultaneously or substantially simultaneously. Any tools or rules that apply to editing multiple objects are applicable here.

FIG. 2B shows another example of an exemplary source lens. Here, both OOP 220b and work window 140 are configured to appear (i.e., rendered) as though "floating" within display 202 (i.e., not docked or fixed to any location). OOP 220b may float anywhere, including above (i.e., overlapping) work window 140. OOP 220b illustrates that objects and elements are, for example, shown by default (note the absence of view check boxes 124). In some examples, the displaying (i.e., showing) of an object or element may be deactivated, for example, by selecting a menu item, icon, widget, or button.

Here, for example, flower object 152a and text object "Nature" 152b have been selected for editing as indicated by the check marks in edit check boxes 226b. When source lens 260b is positioned over any portion of any of the selected objects, the underlying sources of the portion is revealed. Shown in a rectangular shape, source lens 260b is positioned over text object "Nature" 152b. Text object "Nature" 152b illustrates an example of a text-based object that appears as though "warped" or otherwise distorted. When text object "Nature" 152b is viewed through source lens 260b, the underlying sources (e.g., the word "Nature") are shown. Generated effects (e.g., the warping effect) are not shown through source lens 260b. Here, text object "Nature" 152b inside source lens 260b is zoomed to a detail level of 75%, according to zoom control 264b. In this example, zoom control 264b is placed near source lens 260b. Through source lens 260b, nature object 152b may be edited using any text editing techniques, tools, or applications free of the obstructions of any effects or filters (e.g., the warping effect).

Not all enumerated features and properties pertaining to source lenses, objects, elements, sources, layers, and folders are included in some examples. In other examples, there may be additional features and properties. For example, there may be selection boxes, toggle buttons, or other input interfaces to control selection, locking, viewing, printing, editing, and other operations. The above-described structures, features, operations, techniques, procedures, and other aspects may be varied in design, implementation, and function and are not limited to the descriptions provided.

Figure 3:
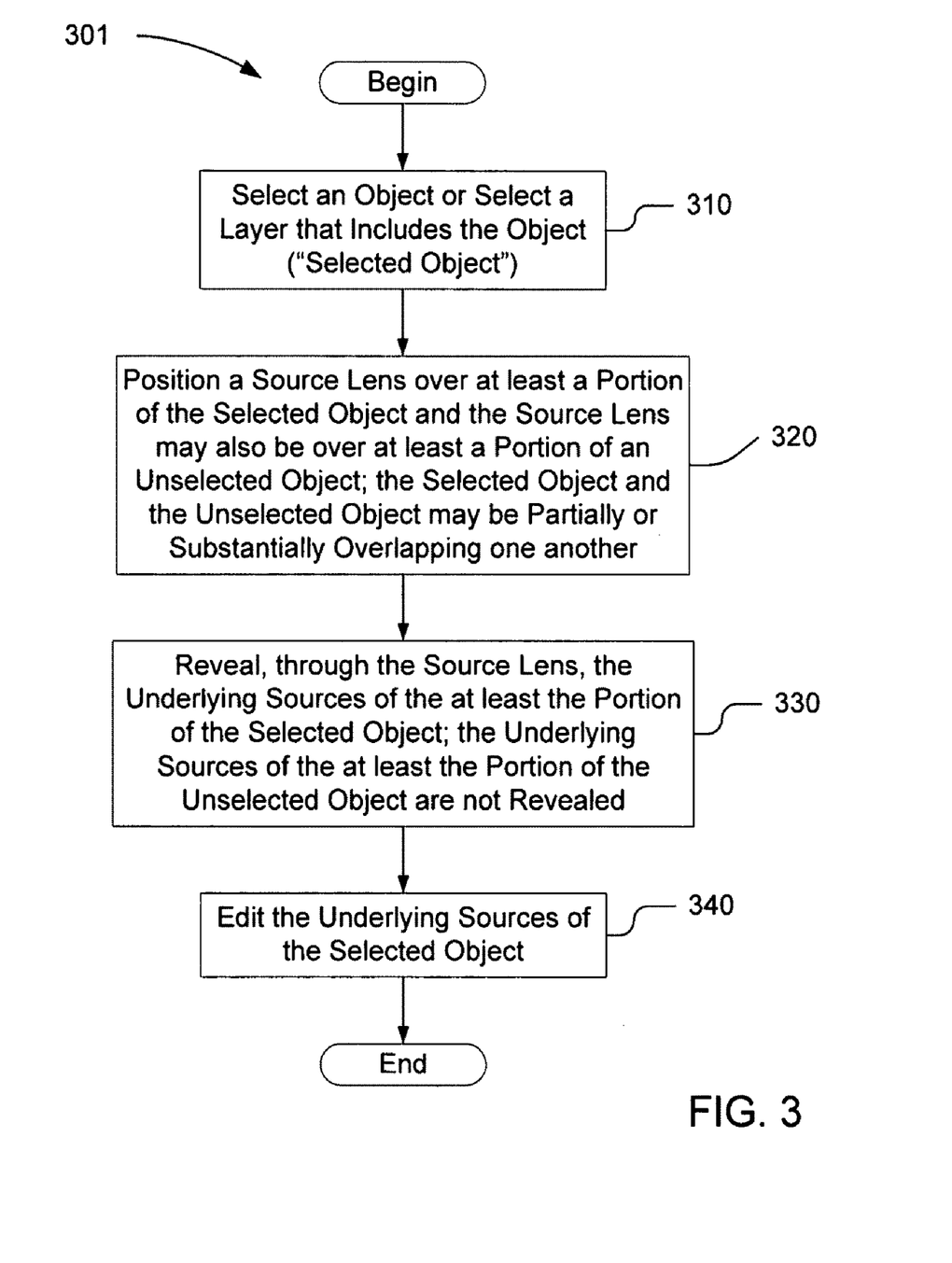
FIG. 3 is a flow diagram of an exemplary process for implementing a source lens.

FIG. 3 is a flow diagram of an exemplary process for implementing a source lens. Here, process 301 is suitable for implementation as, for example, a computer program code, software instructions, firmware, circuitry, logic, or hardware and begins with one or more objects. An object is selected, for example, using the above-described selection techniques (310). Selection may be achieved by deselecting one or more previously selected objects and leaving at least one object remains selected. In some examples, selecting an object may include selecting a layer, which may include an object.

A source lens (e.g., source lens 260a, FIG. 2A) is positioned or repositioned over a selected object (320). In some examples, there may be another object that is not selected. The selected object and the unselected object may not be overlapping each another. In some situations, a selected object and an unselected object may be partially or completely overlapping with the selected object disposed above or below the unselected object. The source lens may also be positioned completely, partially, or substantially over a portion of the selected object. In other examples, a source lens may also be positioned over at least a portion of the unselected object.

At least one underlying source of the selected object or the portion of the selected object (i.e., under the source lens) is revealed through the source lens (330). However, no source of the portion of the unselected object (i.e., under the source lens) is revealed through the source lens. Likewise, if the selected object is in an environment that includes automatically generated elements (e.g., lighting, shadow, shade, or pattern), these elements may not be shown through the source lens.

Here, with the underlying sources of the selected object shown through the source lens free from other obstructions, a selected object can be viewed and edited by directly or indirectly modifying the sources of the selected object (340). Further, any editing techniques, tools, or applications configured to provide the sources of the selected object may be used to edit the sources of the selected object. In some examples, the above-described process may be varied in design, order, implementation, or other aspects, and is not limited to the examples shown and described.

Figure 4:
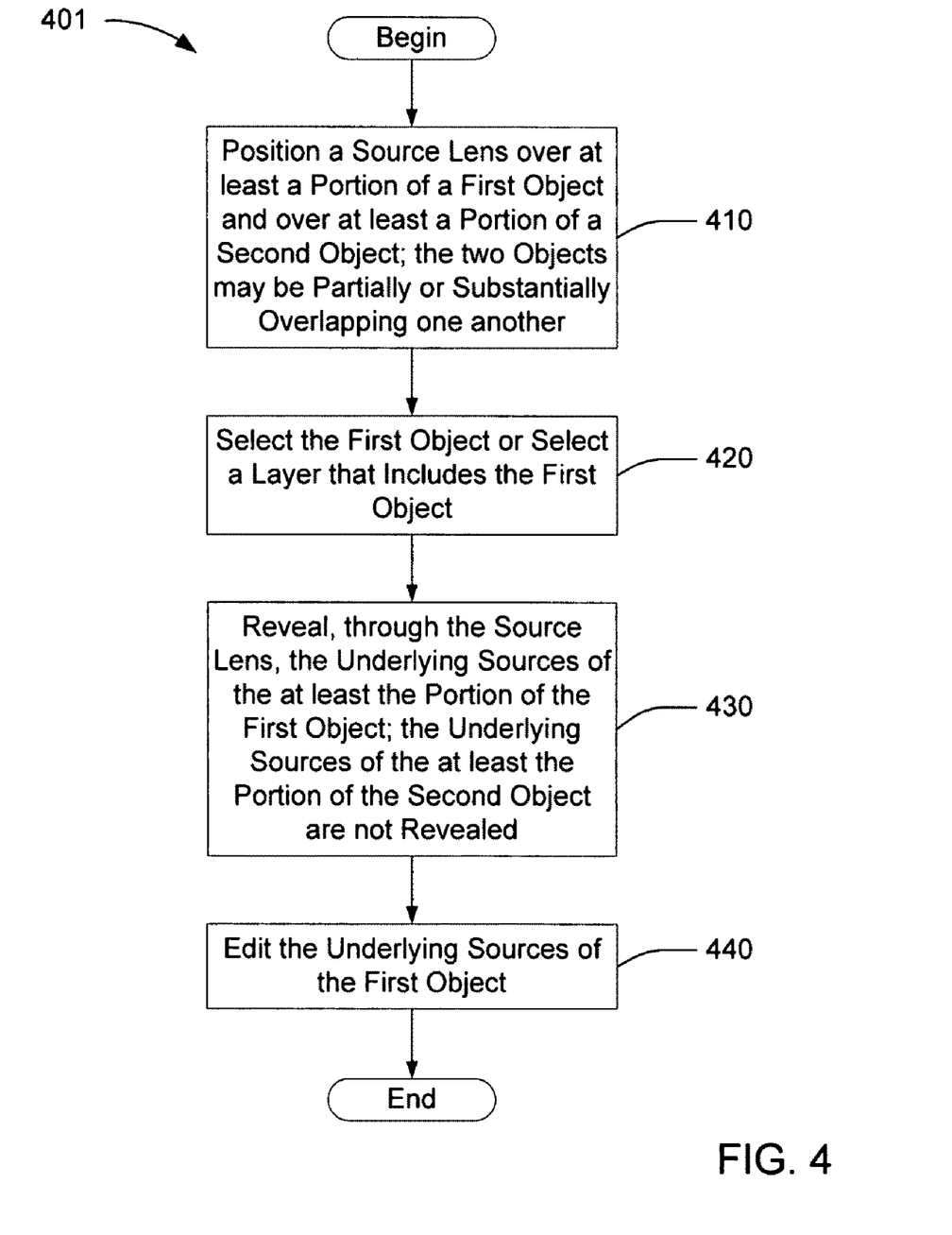
FIG. 4 is a flow diagram of an alternative exemplary process for implementing a source lens.

FIG. 4 is a flow diagram of an alternative exemplary process for implementing a source lens. A first object and a second object may be partially or substantially overlapping each another, with the first object either above or below the second object. In some situations, the first and second objects do not overlap. In some examples, a source lens is positioned or repositioned over a portion of the first object or substantially over the first object (410). The source lens may be positioned over at least a portion of the second object.

In some examples, the first object is selected, for example, using an above-described selection technique (420). In other examples, the first object may be selected by selecting a layer that includes the first object. The selection may be performed in an object organization panel or in a work window, as described above. In some situations, the second object may have been previously selected and thus deselected, leaving the first object selected.

Here, underlying sources of the first object or the portion of the first object that is under the source lens are revealed through the source lens (430). In some examples, no source of the portion of the second object under the source lens is revealed through the source lens. Likewise, if the first object is in an environment that includes automatically-generated elements (e.g., lighting, shadow, shade, and pattern), these elements may not be shown through the source lens.

Here, the underlying sources of the first object shown through the source lens are free from other obstructions (440). The first object may be viewed and edited by directly or indirectly modifying the sources of the first object. In addition, any editing techniques, tools, or applications configured to handle the type of sources of the first object may be used to edit the sources of the first object. In some examples, the above-described process may be varied in design, order, implementation, or other aspects, and is not limited to the examples shown and described. Further, process 401 may be suitable for implementing as programming instructions or in an application, such as the exemplary application described in FIG. 5.

Figure 5:
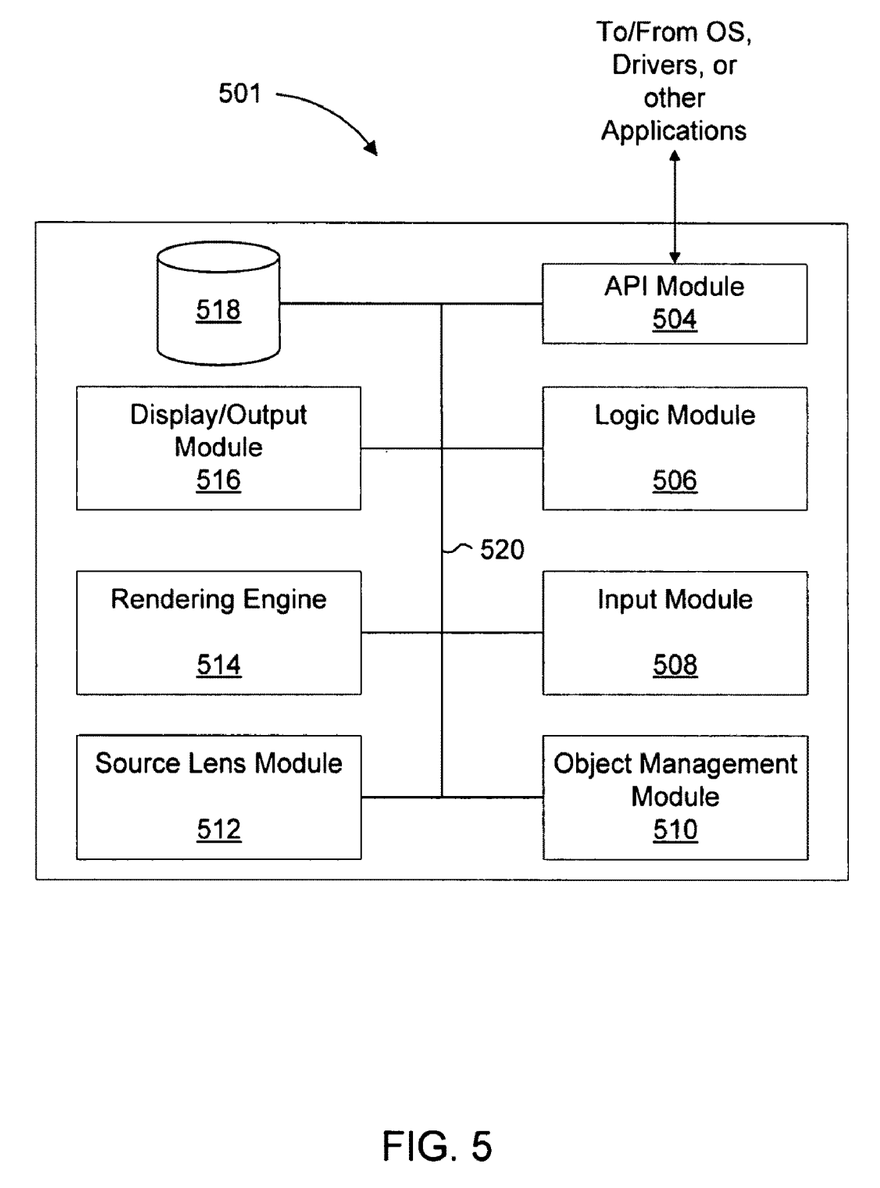
FIG. 5 illustrates an exemplary application where source lenses may be implemented.

FIG. 5 illustrates an exemplary application where source lenses may be implemented. Here, application 501 includes application programming interface ("API") module 504, logic module 506, input module 508, object management module 510, source lens module 512, rendering engine 514, display/output module 516, repository 518, and bus 520. In some examples, API module 504, logic module 506, input module 508, object management module 510, source lens module 512, rendering engine 514, display/output module 516, and repository 518 may be in data communication with each other, other applications, operating systems, drivers, or the like using bus 520, which may be a logical or physical coupling configured to allow data transfer between processes such as those described. Further, API module 504 may be in data communication with one or more external processes (not shown) using actual or physical ports (not shown), processes, or other data interfaces. Other external processes may include, but are not limited to operating systems ("OS"), drivers (e.g., input/output, disk drive, and graphic circuit drivers), firmware, applications, state machines, virtual state machines, and others.

In some examples, when data is received by API module 504, it may be transferred to one or more other modules (e.g., logic module 506, input module 508, object management module 510, source lens module 512, rendering engine 514, display/output module 516, repository 518, and others) using bus 520. For example, after display/output module 516 has displayed a source lens, API module 504 may receive from an input driver (not shown) input data, for example, to select an object, position a source lens tool, resize a source lens, activate a zoom control on a source lens, or edit an object or element. The input data may be transferred to input module 508 for interpretation (e.g., determining which object has been selected for editing) and transferred to display/output module 516 to display a source lens, for example, with the underlying sources of the selected object.

In some examples, logic module 506 may be configured to control the data flow through bus 520 and direct the services provided by API module 504, input module 508, object management module 510, source lens module 512, rendering engine 514, display/output module 516, and repository 518 in order to implement a source lens according to various embodiments. For example, artwork may include one or more objects and elements, which may be stored in repository 518. In response to a check mark added to a view check box next to the object title of an object, logic module 506 may direct object management module 510 to retrieve the object from repository 518, direct rendering engine 514 to render the object, and direct display/output module 516 to display the object.

Logic module 506 may direct source lens module 512 to reveal or show the underlying sources of selected objects. Here, source lens module 512 may be configured to show the underlying sources of an object free from obstructions by the effects and filters of the selected object or by unselected objects. For example, showing the vein skeleton of a leaf without the leaf's surface texture and without the obstruction of a flower above the leaf.

Application 501 and the above-described modules and elements may be varied in design, function, configuration, or implementation and are not limited to the descriptions provided above.

Figure 6:
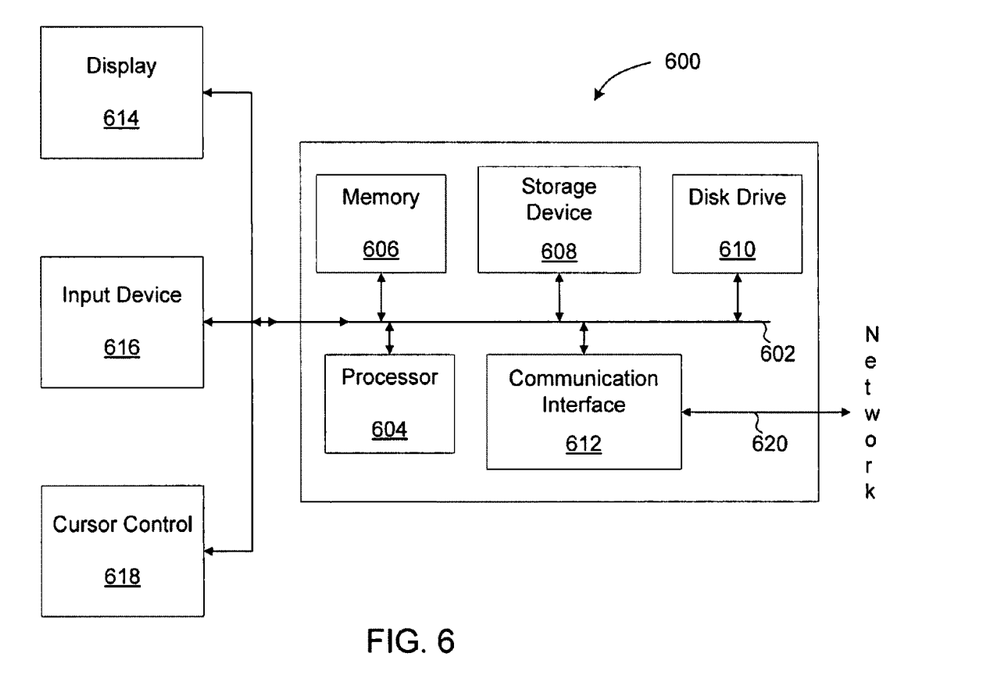
FIG. 6 illustrates an exemplary computer system suitable for implementing source lenses.

FIG. 6 illustrates an exemplary computer system suitable for implementing source lenses. In some examples, computer system 600 may be used to implement computer programs, applications, methods, processes, or other software to perform the above-described techniques. Computer system 600 includes a bus 602 or other communication mechanism for communicating information, which interconnects subsystems and devices, such as processor 604, system memory 606 (e.g., RAM), storage device 608 (e.g., ROM), disk drive 610 (e.g., magnetic or optical), communication interface 612 (e.g., modem or Ethernet card), display 614 (e.g., CRT or LCD), input device 616 (e.g., keyboard), and cursor control 618 (e.g., mouse or trackball). Processor 604 can be a single-core, dual-core, or multi-core processor; and processor 604 can be a processor in a multi-processor environment or a distributed processing environment.

According to some examples, computer system 600 performs specific operations by processor 604 executing one or more sequences of one or more instructions stored in system memory 606. Such instructions may be read into system memory 606 from another computer readable medium, such as static storage device 608 or disk drive 610. In some examples, circuitry may be used in place of or in combination with software instructions for implementation.

The term "computer readable medium" refers to any medium that participates in providing instructions to processor 604 for execution. Such a medium may take many forms, including but not limited to, non-volatile media, volatile media, and transmission media. Non-volatile media includes, for example, optical or magnetic disks, such as disk drive 610. Volatile media includes dynamic memory, such as system memory 606. Transmission media includes coaxial cables, copper wire, and fiber optics, including wires that comprise bus 602. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions may be performed by a single computer system 600. According to some examples, two or more computer systems 600 coupled by communication link 620 (e.g., LAN, PSTN, or wireless network) may perform the sequence of instructions in coordination with one another. Computer system 600 may transmit and receive messages, data, and instructions, including program, i.e., application code, through communication link 620 and communication interface 612. Received program code may be executed by processor 604 as it is received, and/or stored in disk drive 610, or other non-volatile storage for later execution.

The foregoing examples have been described in some detail for purposes of clarity of understanding, but are not limited to the details provided. There are many alternative ways and techniques for implementation. The disclosed examples are illustrative and not restrictive.

What is claimed:

1. A method, comprising:
performing by a computing device:
receiving input indicating selection of an object, wherein the object is displayed according to one or more automatically-generated styles, effects or filters applied to at least one underlying source for the object;
receiving another input indicating positioning a source lens over a portion of the object, wherein the source lens is configured to reveal the at least one underlying source of the portion; and
revealing through the source lens the at least one underlying source of the portion, wherein said revealing comprises displaying the at least one underlying source of the portion without the one or more automatically-generated styles, effects or filters applied.

2. The method of claim 1, wherein the source lens is positioned over a portion of an unselected object, and a source for the unselected object is not revealed through the source lens.

3. The method of claim 1, further comprising:
receiving input indicating selection of another object, wherein the source lens is positioned over another portion of the another object, and the source lens being configured to reveal another underlying source of the another portion; and
revealing the another underlying source of the another portion.

4. The method of claim 2, wherein the object at least partially overlaps the unselected object, wherein the source for a portion of the object overlapping the unselected object is revealed through the source lens without revealing the source for the unselected object.

5. The method of claim 2, wherein the unselected object at least partially overlaps the object, wherein the source for a portion of the object overlapped by the unselected object is revealed through the source lens without revealing the source for the unselected object.

6. The method of claim 1, further comprising receiving through the source lens input indicating an edit associated with the at least one underlying source of the object.

7. The method of claim 1, wherein the selecting the object comprises selecting a layer that comprises the object.

8. The method of claim 1, wherein the source lens is configured to be repositioned.

9. The method of claim 1, wherein the source lens is configured to be resized.

10. The method of claim 1, wherein the source lens is configured to zoom, revealing one or more detail levels of the at least one underlying source of the portion of the object.

11. The method of claim 1, wherein the at least one underlying source comprises at least one of audio data, raster data, vector data, text, or instructions.

12. A system, comprising:
a memory configured to store data associated with an object; and
a processor configured to:
display the object according to one or more automatically-generated styles, effects or filters applied to at least one underlying source for the object;
select the object;
position a source lens over a portion of the object, wherein the source lens is configured to reveal the at least one underlying source of the portion; and
reveal through the source lens the at least one underlying source of the portion, wherein to reveal the at least one underlying source of the portion, the processor is further configured to display the at least one underlying source of the portion without the one or more automatically-generated styles, effects or filters applied.

13. A computer program product embodied in a non-transitory computer-readable medium and comprising computer instructions for:
receiving input indicating selection of an object, wherein the object is displayed according to one or more automatically-generated styles, effects or filters applied to at least one underlying source for the object;
receiving another input indicating positioning a source lens over a portion of the object, wherein the source lens is configured to reveal the at least one underlying source of the portion; and
revealing through the source lens the at least one underlying source of the portion, wherein said revealing comprises displaying the at least one underlying source of the portion without the one or more automatically-generated styles, effects or filters applied.

14. The computer program product of claim 13, wherein receiving the input indicating selection of the object comprises selecting a layer that comprises the object.

15. The computer program product of claim 13, wherein the source lens is configured to be repositioned and resized when placed at least partially over the object.

16. The computer program product of claim 13, further comprising editing, through the source lens, the at least one underlying source of the portion, wherein the at least one underlying source comprises at least one of audio data, raster data, vector data, text, or an instruction.

17. A method, comprising:
performing by a computing device:
receiving input indicating positioning a tool over a portion of an object and over another portion of another object, wherein the object is displayed according to one or more automatically-generated styles, effects or filters;
receiving input indicating selection of the object using a graphical user interface; and
revealing, through the tool, source data associated with the portion of the object, wherein revealing the source data comprises displaying the source data without the one or more automatically-generated styles, effects or filters, and without displaying source data for the other object.

18. A computer program product embodied in a non-transitory computer-readable medium and comprising computer instructions for:
receiving input indicating positioning a tool over a portion of an object and over another portion of another object, wherein the object is displayed according to one or more automatically-generated styles, effects or filters;
receiving input indicating selection of the object using a graphical user interface; and
revealing, through the tool, source data associated with the portion of the object wherein revealing the source data comprises displaying the source data without the one or more automatically-generated styles, effects or filters, and without displaying source data for the other object.

* * * * *